United States Patent [19]

Yonezawa et al.

[11] Patent Number: 4,707,816

[45] Date of Patent: Nov. 17, 1987

[54] METHOD AND APPARATUS FOR COMPOSITE WOBBLED AND PUSH-PULL TRACKING SERVO SYSTEM

[75] Inventors: Seiji Yonezawa, Hachioji; Masatoshi Ohtake, Ome; Masaru Ito, Sagamihara; Toshiaki Tsuyoshi, Kokubunji; Kazuo Ichino, Tokyo; Harushige Nakagaki, Yokohama, all of Japan

[73] Assignee: Hitachi, Ltd., Tokyo, Japan

[21] Appl. No.: 938,961

[22] Filed: Dec. 8, 1986

Related U.S. Application Data

[63] Continuation-in-part of Ser. No. 845,340, Mar. 28, 1986.

[30] Foreign Application Priority Data

Mar. 29, 1985 [JP] Japan .................................. 60-63587
Jul. 5, 1985 [JP] Japan .................................. 60-146507
Jul. 29, 1985 [JP] Japan .................................. 60-165777
Dec. 6, 1985 [JP] Japan .................................. 60-273228

[51] Int. Cl.$^4$ .......................... G11B 7/09; G11B 7/095
[52] U.S. Cl. ........................ 369/44; 369/46; 369/105; 369/275; 358/342
[58] Field of Search .................... 369/44–46, 369/54, 58, 100, 105, 106, 109, 111, 124, 275; 358/335, 342; 360/77

[56] References Cited

U.S. PATENT DOCUMENTS

| | | | |
|---|---|---|---|
| 3,876,842 | 4/1975 | Bouwhuis | 369/46 X |
| 4,209,804 | 6/1980 | Dil | 369/109 X |
| 4,363,116 | 12/1982 | Kleuters et al. | 369/44 X |
| 4,364,118 | 12/1982 | Maeda et al. | 369/44 |
| 4,375,088 | 2/1983 | deHaan et al. | 369/44 X |
| 4,402,061 | 8/1983 | Hazel et al. | 369/46 X |
| 4,428,069 | 1/1984 | Hazel et al. | 369/100 X |
| 4,432,083 | 2/1984 | Hsieh et al. | 369/44 |
| 4,456,981 | 6/1984 | Silvy et al. | 358/342 X |
| 4,464,714 | 8/1984 | Huijser et al. | 369/44 X |
| 4,553,228 | 11/1985 | Gerard et al. | 369/275 X |

Primary Examiner—Raymond F. Cardillo
Assistant Examiner—Wayne R. Young
Attorney, Agent, or Firm—Antonelli, Terry & Wands

[57] ABSTRACT

A composite wobbled tracking servo system uses a rotary optical disc which has a header field and a data field alternately arranged along the direction of rotation, and which includes pregrooves formed in at least the data field and at least one pair of wobbled track marks disposed in each of the header fields in a relation wobbled relative to the center of a track. A light spot is directed toward and onto the optical disc to detect a push-pull tracking error signal from the reflection of the light spot diffracted from the pregroove, and a wobbled tracking error signal is detected from the reflection of the light spot passing the wobbled track marks. After attenuating the gain of the wobbled tracking error signal by a low-pass filter so that the gain of the wobbled tracking error signal becomes equal to that of the push-pull tracking error signal at a frequency fe satisfying the relation $$1/50 \cdot N \cdot fd < fe < 1/5 \cdot N \cdot fd$$

where N is the number of the header fields included in one complete revolution of the disc, and fd is the frequency of rotation of the disc, the attenuated wobbled tracking error signal is combined with the push-pull tracking error signal to provide a composite tracking error signal which is used for the tracking control.

13 Claims, 24 Drawing Figures

HEADER FIELD ← → DATA FIELD

HEADER FIELD ← | → DATA FIELD ←

METHOD AND APPARATUS FOR COMPOSITE WOBBLED AND PUSH-PULL TRACKING SERVO SYSTEM

CROSS-REFERENCE TO RELATED APPLICATION

This application is a continuation-in-part of application Ser. No. 845,340, filed on Mar. 28, 1986, in the name of Seiji YONEZAWA et al.

BACKGROUND OF THE INVENTION

This invention relates to a tracking servo system for tracking the center of a track with a light spot, and more particularly to a composite tracking servo system in which a differential diffraction method using pregrooves or a so-called push-pull tracking method is combined with a wobbled tracking method using wobbled track marks disposed in a relation wobbled relative to the center of a track, and which is suitable for application to an optical code data memory such as a recordable/reproducible adding (write once) type optical disc system or an erasable type optical disc system.

In the push-pull tracking method, an optical disc having guide grooves or so-called pregrooves formed previously along the direction of rotation of the disc is irradiated with a light spot, and an unbalance of the distribution of the reflection of light diffracted from the pregrooves is based to detect a track error which is fed back to a servo system. This push-pull tracking method is disclosed in, for example, U.S. Pat. No. 4,363,116. Since this push-pull tracking method utilizes the distribution of the light diffracted from the pregrooves, an offset component attributable to an eccentricity or tilt of the disc tends to occur, and, because of such an offset component, the light spot cannot be accurately positioned on the center of the track. According to the researches made by the inventors, a tilt of 0.7° or an eccentricity of 100 μm, for example, results in an offset of about 0.1 μm.

On the other hand, a tracking servo system of three spots type is widely employed in a playback-only system such as a CD (a compact disc). However, this tracking servo system is unfit for application to a combined recording/reproduction system. The tracking servo system of three spots type is disclosed in, for example, U.S. Pat. No. 3,876,842.

SUMMARY OF THE INVENTION

With a view to solve the prior art problem of the offset pointed out above, it is a primary object of the present invention to provide an optical tracking method and apparatus which can eliminate the undesirable offset (the error component) thereby ensuring more accurate tracking.

The present invention utilizes the so-called track wobbling method in which an optical disc is previously formed with one or more sets of wobbled pits disposed in a relation wobbled relative to the center of a track, and the relative amounts of light reflected from these pits as a result of irradiation with a light spot are compared to detect a track error, if any. This track wobbling method is already known per se and disclosed in, for example, U.S. Pat. No. 4,223,187.

According to this track wobbling method, the true position of light spot passed through the wobbled pits can be detected. Therefore, a more accurate servo system can be provided as compared to a servo system utilizing the push-pull method based on the distribution of diffraction by the pregrooves. On the other hand, however, the track wobbling method requires provision of 1,000 or more wobbled pits per track, resulting in a correspondingly reduced data efficiency. The track wobbling method has such another problem that it is not compatible with the push-pull method.

In view of the above prior art problems, the present invention provides a tracking system of high utility which has such features that (1) the merit of the wobbled tracking method is maintained; (2) the data efficiency is not degraded; and (3) it is compatible with the push-pull tracking system which is a prior art system most widely employed in this field. The tracking servo system according to the present invention is a composite of the push-pull tracking system using the pregrooves and the wobbled tracking system using the wobbled track marks, and has a dual structure so that an offset component of low-frequency from the dc level, which tends to occur in the push-pull servo system, can be suppressed in the wobbling servo system. More precisely, one complete track on an optical disc is divided into a plurality of sectors each of which includes a header field (or an index field) previously formed with pits and a data field on which the user records desired information. In the header field, wobbled track marks in the form of one or more pairs of elongate pits are previously formed in a relation wobbled relative to the center of the track, and pregrooves for tracking purpose are previously formed in at least the data field. The word "previously" as used herein means that the wobbled track marks and the pregrooves have been provided before the user records desired information on the data field. Preferably, the wobbled track marks and the pregrooves which have been formed during preparation of a mother disc are provided by replication of the mother disc. It is also preferable that address information (a track address and a sector address) for identifying the specific sector and a sector mark indicating the head of the specific sector are previously formed in the header field. The wobbled track mark may act also as the sector mark. In the recording and reproduction of data on and from the data field, a light spot is directed to the prewobbling pits disposed in the header field, so as to detect an accurate prewobbling tracking error signal free from any offset of the position of the light spot from the center of the track. Then, a push-pull tracking error signal including an offset and utilizing the distribution of the reflection of light diffracted from the pregrooves is corrected on the basis of the prewobbling tracking error signal, thereby eliminating the offset attributable to deviation of the diffracted light beam on a light detector and ensuring stable and highly accurate tracking operation. While tracking in the manner described above, data are recorded on or reproduced from one of the pregrooves or a land between the pregroove and an adjacent pregroove.

As many as about several-ten wobbled track marks are provided for each track to provide the prewobbling tracking error signal which is an intermittent signal. For the purpose of obtaining continuous prewobbling tracking error signal, holding means is provided for holding the signal during the period of time corresponding to the interval between the wobbled track marks. The prewobbling tracking error signal appearing at the output of the holding means includes unnecessary higher harmonic components. However, the low frequency component only of the prewobbling tracking error signal has a significance from the aspect of tracking control. Therefore, the gain of the prewobbling tracking servo loop is selected to be higher than that of the push-pull tracking error signal in a low frequency range, and after attenuating the prewobbling tracking error signal components having frequencies higher than a predetermined frequency through a low-pass filter. The low-pass filtered prewobbling tracking error signal is combined with the push-pull tracking error signal to provide a composite tracking error signal.

In the present invention, there is an important relation among the gain Kw of a prewobbling tracking error detecting system, the gain Kd of a push-pull tracking error detecting system and the time constant of such a low-pass filter. Since an offset $\epsilon$ occurs only in the push-pull tracking error detecting system, the offset $\epsilon$ included in the composite tracking error signal is relatively reduced to Kd/(Kd+Kw). Therefore, the higher the gain Kw, the effect of offset suppression becomes greater. However, according to the theorem of sampling, the highest frequency component for which the prewobbling tracking error signal has a significance is 0.5·N·fd, where N is the number of prewobbled track marks per track, and fd is the frequency of rotation of the disc. Thus, in a high frequency range, the tracking error signal in the prewobbling system must be sufficiently small as compared to that in the push-pull system. Therefore, the value of the gain Kw is limited by the number N of the wobbled track marks, the frequency of rotation fd of the disc and the time constant of the low-pass filter. According to the present invention, a composite tracking servo system which operates stably with improved performance can be provided by constructing the servo system so as to satisfy the relation 1/50·N·fd < fe < 1/5·N·fd where fe is a frequency at which the gain of the prewobbling tracking error signal after having been passed through the low-pass filter becomes equal to that of the push-pull tracking error signal.

BRIEF DESCRIPTION OF THE DRAWINGS

FIGS. 13(a-f) shows waveforms appearing at various parts of FIG. 12.

DESCRIPTION OF THE PREFERRED EMBODIMENTS

The tracking error signal detecting method according to the present invention is the combination of the prewobbling method and the push-pull method as described already. This detecting method will be first described.

Figure 1:
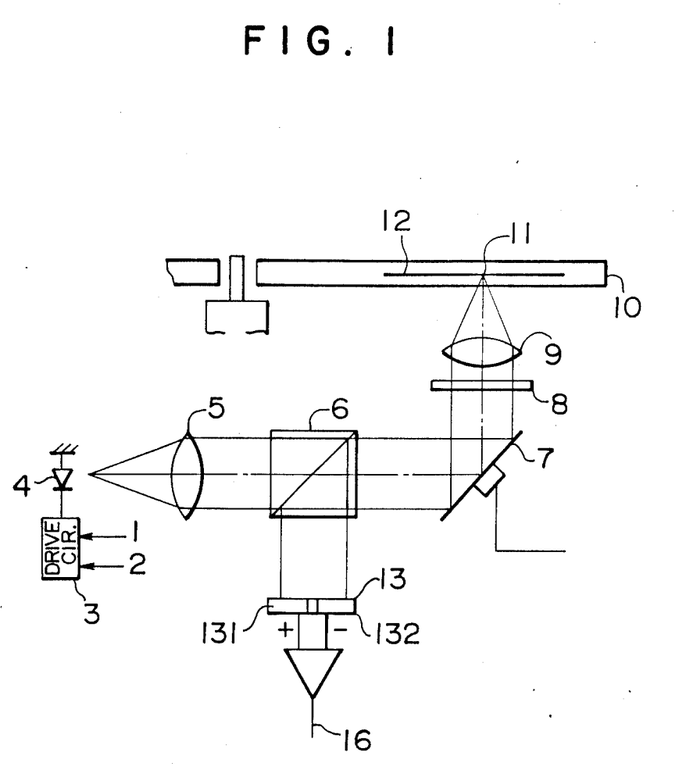
FIG. 1 shows an optical system for recording and reproducing information on and from an optical disc.
Figure 2A:
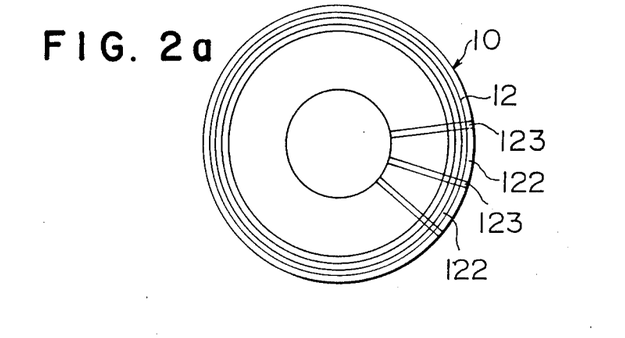
FIGS. 2a to 2d illustrate various examples of the structure of pregrooved tracks of a recordable/reproducible optical disc employed in the present invention.

FIG. 1 shows the structure of one form of an optical system for recording and reproducing information on and from an optical disc. Referring to FIG. 1, semiconductor laser drive signals 1 and 2 are applied to a semiconductor laser driver circuit 3 to drive a semiconductor laser 4. Light emitted from the semiconductor laser 4 passes through a coupling lens 5, a beam splitter 6, a galva mirror 7, a ¼ wavelength plate 8 and an objective lens 9 to form a light spot 11 on a recording surface of an optical disc 10 thereby irradiating a track 12. The reflection of light diffracted from the track 12 returns to the optical system again, and, after being reflected by the beam splitter 6, is received by a two-divided light detector 13 light-receiving sections 131 and 132) to be turned into an electrical signal. FIGS. 2a to 2d illustrate various examples of the structure of pregrooved tracks of a recordable/reproducible optical disc of the present invention adapted to be used in such an optical disc apparatus. Referring to FIG. 2a, one complete track 12 is divided into, for example, 64 sectors each of which includes a set of a header field 123 previously formed with pits and a data field 122 on which the user records desired information. In the header field 123, a selected number of, or, for example, a pair of pits (wobbled track marks) 20-1 and 20-2 wobbled relative to the track center are previously formed by replication, so as to detect a tracking error signal according to the prewobbling method. Besides these pits 20-1 and 20-2, pits 14 indicative of a track address, a sector address, a synchronizing signal, etc. are formed along the track center without being arranged in a wobbled relation. However, these pits 14 are not necessarily essentially required in the tracking servo system of the present invention and may be omitted as required.

In FIGS. 2a to 2d, the wobbled track marks 20-1 and 20-2 act also as sector marks indicating the head of the corresponding sector. However, these marks 20-1 and 20-2 may be disposed in any other position, for example, between the sector marks and the address signal prepits or in a gap area between the address signal prepits and the data field. Preferably, the prepits (including the wobbled track marks) previously formed in the header field 123 are of phase structure having a depth which is ¼ or ⅛ of the wavelength of the laser beam used for recording and reproduction of information on and from the data field 122. It is also preferable that at least the pregrooves formed in the data field 122 are of phase structure having a depth which is ⅛ of the wavelength of the laser beam and are concentrically or spirally arranged.

Figure 2B:
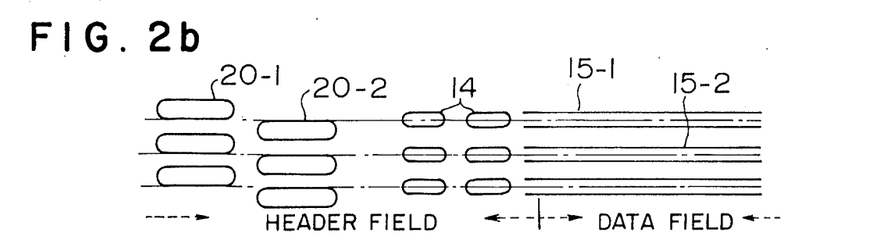
Figure 2C:
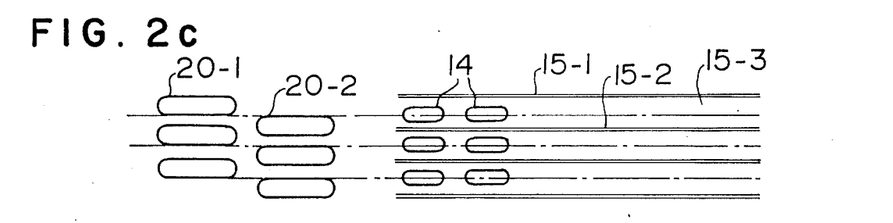
Figure 2D:
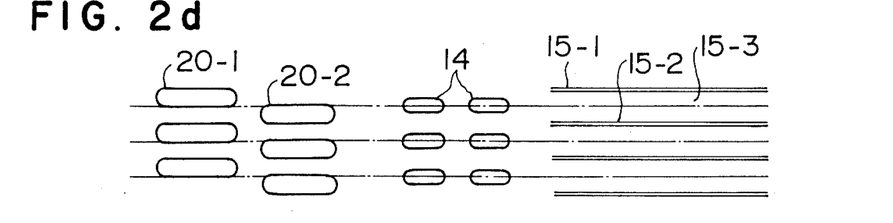

In FIG. 2b, the track center registers with the center of the pregrooves 15-1 and 15-2, and data are recorded on these pregrooves. Although, in FIG. 2b, no pregrooves are provided in the area where the prepits 14 are formed, the pregrooves 15-1 and 15-2 may be formed in this area too. In FIGS. 2c and 2d, the track center registers with the centerline extending between the adjacent pregrooves 15-1 and 15-2, and data are recorded on a land 15-3 defined between the pregrooves 15-1 and 15-2. As shown in FIG. 2d, the pregrooves 15-1 and 15-2 may be formed at least in the data field 122. Further, as shown in FIG. 2c, the pregrooves 15-1 and 15-2 may also be formed to sandwich the prepits 14 therebetween in the area where the prepits 14 are formed in the header field 123. Further, the pregrooves 15-1 and 15-2 may be formed to sandwich the wobbled track marks 20-1 and 20-2 therebetween and may extend throughout the header field 123 and data field 122 without any discontinuity. The aforementioned wobbled track marks, prepits and pregrooves are previously formed during preparation of a mother disc, and a disc substrate obtained by replication of the mother disc having the wobbled track marks, prepits and pregrooves previously formed thereon is coated with a desired recording layer. In the case of, for example, ablative recording, a layer of a material such as TeSePb, whose principal component is Te, is preferably used as the recording layer. On the other hand, in the case of magneto-optical recording, a vertical magnetized film of a material such as TbFeCo, whose principal component is TbFe, is preferably used as the recording layer. Also, in the case of phase change recording, a layer of a material such as an amorphous Te compound is preferably used as the recording layer.

Figure 3A:
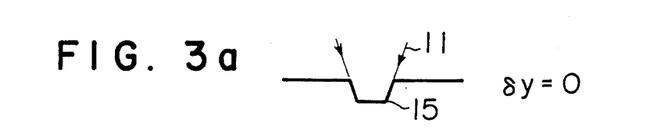
FIGS. 3a to 3d illustrate the principle of detection of a push-pull tracking error on the basis of the distribution of diffracted light.
Figure 3B:
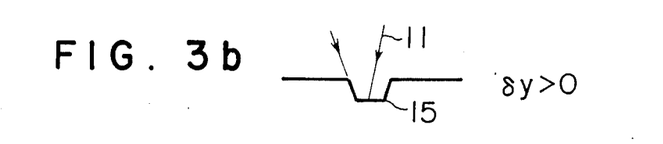
Figure 3C:
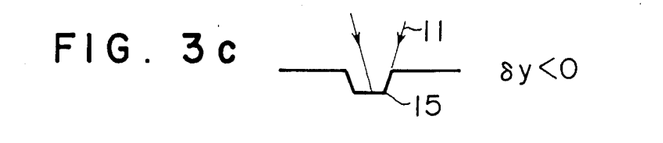
Figure 3D:
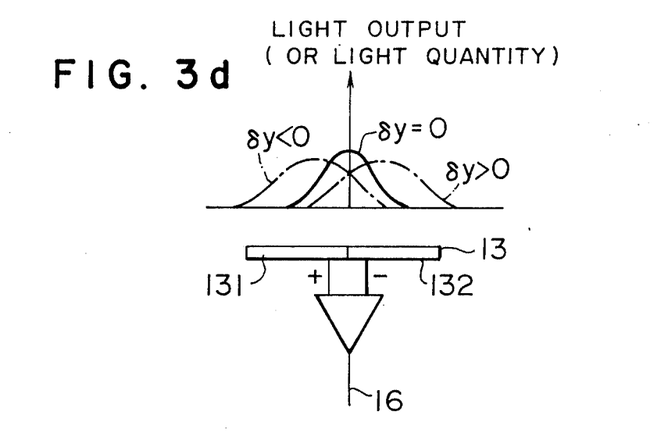

FIGS. 3a to 3d illustrate the distribution of diffract light on the two-divided light detector 13 (the light-receiving sections 131 and 132) when the light spot 11 directed onto the pregroove 15 of phase structure deviates from the center of the pregroove 15. Deviation of the light spot 11 from the center of the track results in an asymmetrical distribution of diffracted light. Therefore, when the diffracted light from the pregroove 15 is received by the two light receiving sections 131 and 132 disposed in parallel to the track to sandwich therebetween the track, and the difference between the output signals of the two light receiving sections 131 and 132 is found, a push-pull tracking error signal 16 can be detected as shown in FIG. 3d. FIGS. 3a to 3c show the relation between the light spot 11 and the pregroove 15. An interference pattern between light of zeroth order and light of first order diffracted by the pregroove 15 appears on the two-divided light detector 13. In the absence of deviation of the light spot 11 from the track, this interference pattern is symmetrical with respect to the pregroove 15. On the other hand, in the presence of deviation, the symmetry of the interference pattern is lost, and the differential output of the two-divided light detector 13 is not zero, so that the track error can be detected. This differential output of the light detector 13 is fed back to a tracking actuator, for example, the galva mirror 7 to constitute a tracking servo.

When the light spot 11 is directed toward or positioned on the center of the land 15-3 between the adjacent pregrooves 15-1 and 15-2 as shown in FIG. 2c or 2d, the polarity of the differential output of the light detector 13 should be inverted before being fed back to the tracking actuator or galva mirror 7. That is, when the light spot 11 is directed toward or positioned on the land 15-3 between the pregrooves 15-1 and 15-2, the light spot 11 diverges over the two pregrooves 15-1 and 15-2, and the diffracted pattern appears on the light detector 13 as when the light spot 11 is centered on the pregroove 15. The light detector 13 is in no way limited to that of the two-divided type described above and may be of a three-divided type in which another light receiving section is interposed between a pair of light receiving sections for tracking purpose. The requirement is that the light detector has such a structure that at least two light detecting sections (light receiving sections) are disposed to sandwich the track therebetween in parallel to the extending direction of the track. An example of such a light detector detecting the track error, if any, on the basis of diffracted light from a pregroove is disclosed in, for example, U.S. Pat. No. 4,525,826.

Figure 4:
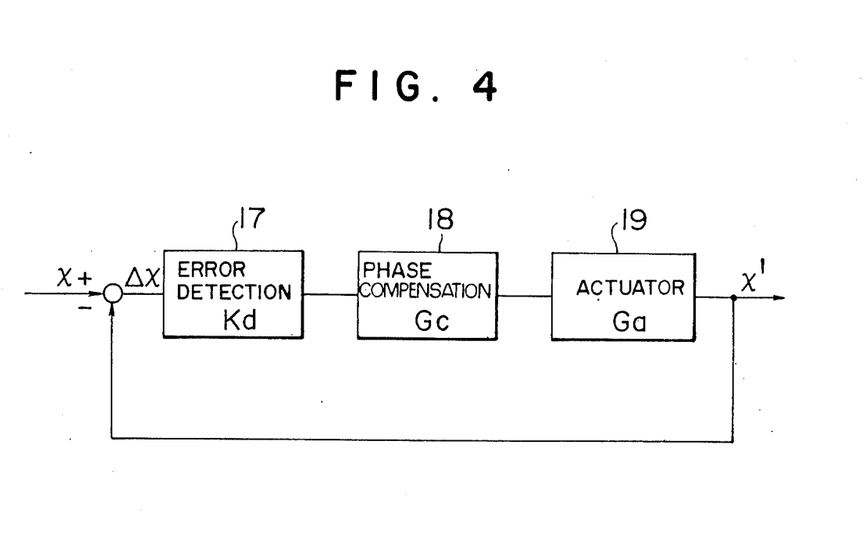
FIG. 4 is a block diagram showing the structure of a continuous tracking servo system.
Figure 5:
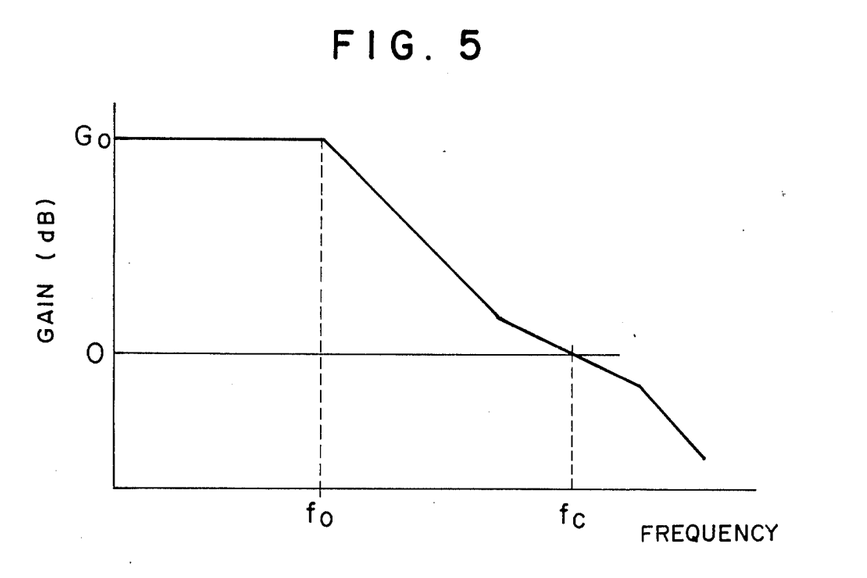
FIG. 5 is a Bode diagram for illustrating the frequency characteristic of a conventional continuous tracking servo system as shown in FIG. 4.

FIG. 4 is a block diagram showing the structure of a push-pull tracking servo system based on the principle described with reference to FIGS. 3a to 3d, and FIG. 5 is an example of a Bode diagram of the loop transfer function of the servo system shown in FIG. 4. Referring to FIG. 4, the servo system includes a tracking error detecting element (Kd) 17, a phase compensating element (Gc) 18, and a tracking actuator (Ga) 19. According to the so-called push-pull tracking system for obtaining the differential signal 16 indicative of the distribution of the reflection light diffracted from the pregroove 15, the galva mirror 7 is moved so that the light spot 11 can follow up, for example, eccentricity of the optical disc 10 shown in FIG. 1 for the purpose of tracking control. When the mirror 7 is moved, the diffracted light distribution on the light detector 13 shifts as shown in FIG. 3d. The shifting of the diffracted light distribution results in appearance of an offset component in the tracking error signal 16. Further, when the optical disc 10 tilts, the diffract light distribution on the two light receiving sections 131 and 132 of the two-divided light detector 13 disposed in parallel to the track 12 is now out of balance, and such a phenomenon occurs in which the tracking error signal 16 does not become zero even when the light spot 11 is positioned on the track center (the center of the pregroove 15 or the center of the land 15-3), that is, a track offset occurs. consequently, the light spot 11 cannot be accurately positioned on the track center. Therefore, according to the present invention, an offset-free prewobbling tracking error signal detected when the light spot 11 irradiates the prewobbling pits 20-1 and 20-2 in the header field 123 is utilized for offset correction of the push-pull tracking error signal 16 which includes the offset and which is detected when the light spot 11 irradiates the pregroove 15 disposed in the data field 122. In this manner, while correcting the push-pull tracking error signal 16 on the basis of the offset-free prewobbling tracking error signal, data pits are accurately recorded and reproducted, with a high S/N ratio, on and from the pregroove 15 or inter-pregroove land 15-3.

How to detect the tracking error signal from the prewobbling pits 20-1 and 20-2 shown in FIGS. 2b to 2d according to the present invention will now be described with reference to FIG. 6.

Figure 6:
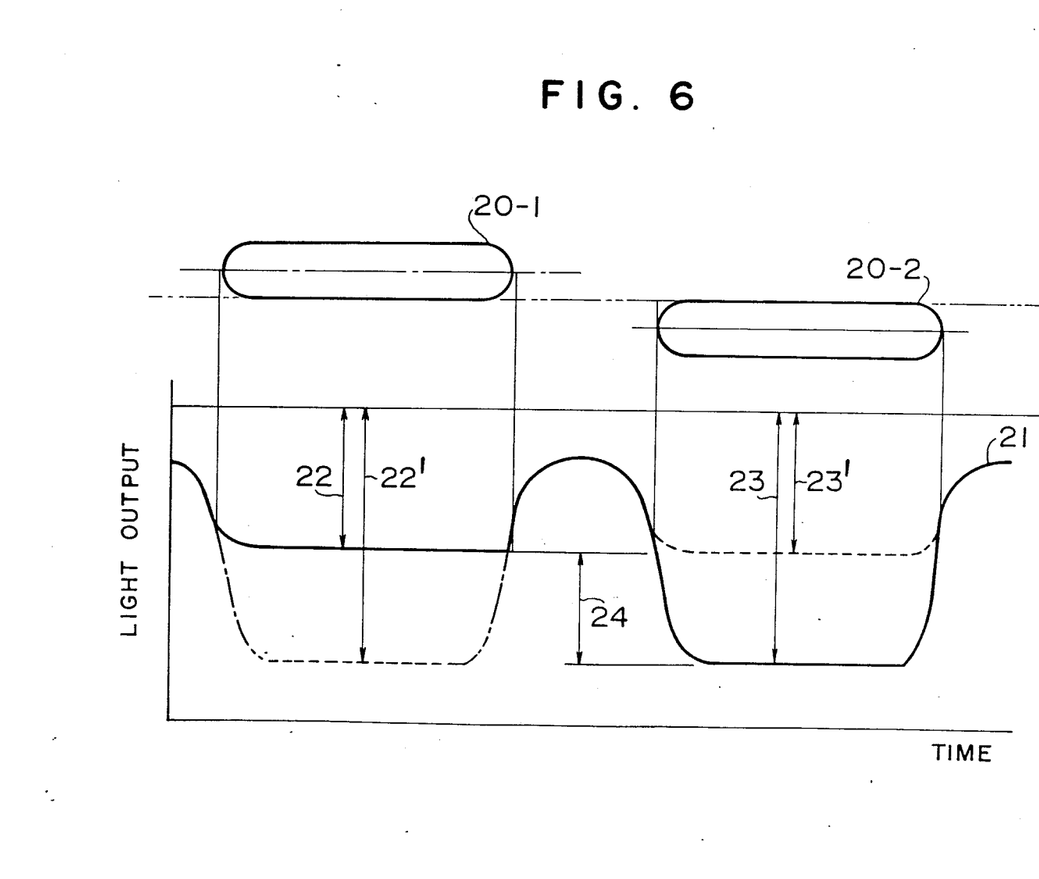
FIG. 6 illustrates how a tracking signal is obtained from prewobbling pits according to the present invention.

FIG. 6 shows the arrangement of at least one pair of elongate pits 20-1 and 20-2 disposed in a relation wobbled relative to the track center so as to detect the prewobbling tracking error signal according to the present invention and shows also the relation between the passing position of the light spot 11 and the waveform of the reflected light output. When now the light spot 11 irradiates the pair of wobbled track marks 20-1 and 20-2 while crossing them, it will be seen in FIG. 6 that the light output signals relevant to the elongate pits 20-1 and 20-2 arranged in the relation wobbled relative to the track center have opposite phase depending on the transverse deviation of the center of the light spot 11 from the track center. That is, when the light spot 11 traverses the portion nearer to the pit 20-1, the output signal 21 has a waveform as shown by the dotted line, while, when the light spot 11 traverses the portion nearer to the pit 20-2, the output signal 21 has a waveform inverted by 180° in phase, as shown by the solid line. Therefore, by detecting the individual peaks 22 (22') and 23 (23') of the output signal 21 (the sum output of the two-divided or three-divided light detector) appearing when the light spot 11 traverses the pits 20-1 and 20-2 respectively and then detecting the difference signal 24 therebetween, this differential signal 24 indicates the amount and direction of deviation of the light spot 11 from the track center.

The method of detecting the prewobbling tracking error signal 24 described with reference to FIG. 6 is not based on the diffracted light distribution. Therefore, a dc tracking offset component attributable to tilting of the disk 10 or, for example, movement of the lens 9 or rotation of galva mirror 7 as a result of tracking control does not occur, so that the amount of the true tracking error can be accurately detected.

The composite wobbled tracking servo system of the present invention can attain accurate tracking, since it comprises the combination of the two different tracking error detection methods, that is, the method of detecting the dc-offset-free tracking error signal 24 obtained from the prewobbling pits 20-1 and 20-2 shown in FIG. 6 and the method of detecting the low frequency-offset-including tracking error signal 16 obtained from the pregroove 15 shown in FIGS. 3a to 3d.

Figure 7:
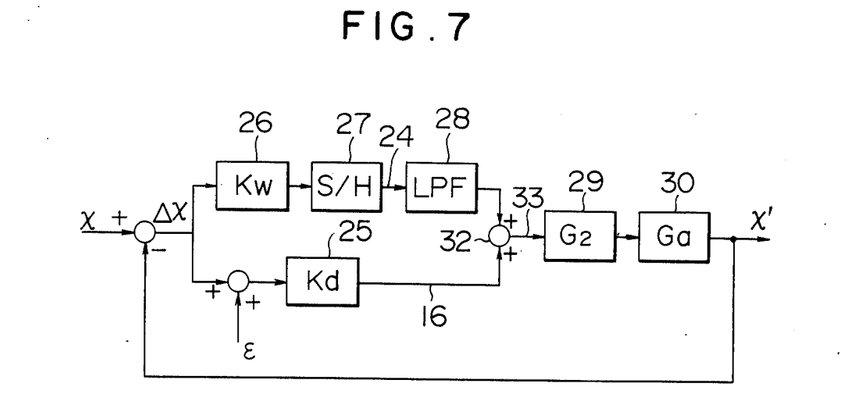
FIG. 7 is a block diagram showing the structure of an embodiment of the composite wobbled tracking servo system according to the present invention.

FIG. 7 is a block diagram showing the structure of an embodiment of the composite wobbled tracking servo system according to the present invention. The tracking servo system of the present invention shown in FIG. 7 has a dual servo system structure including a push-pull loop and a wobbled loop. In the tracking servo system of the present invention, the push-pull loop includes a tracking error detecting element (Kd) 25 for converting the amount and direction of a tracking error utilizing the distribution of light diffracted from the pregrooves, a phase compensating element ($G_2$) 29 and a tracking actuator (Ga) 30. The wobbled loop includes a tracking error detecting element (Kw) 26 for detecting a tracking error utilizing the wobbled track marks, a sample/hold circuit (S/H) 27 and a primary low-pass filter (Gf) 28. The wobbled loop further includes the phase compensating element 29 and the tracking actuator 30 in common to the push-pull loop.

As described already, as many as about several-ten wobbled track marks are provided for each track, and the prewobbling tracking error signal 24 is an intermittent signal obtained from those wobbled track marks only. For the purpose of providing the prewobbling tracking error signal 24, the sample/hold circuit 27 holds the signal during the period of time corresponding to the interval between the wobbled track marks. The prewobbling tracking error signal 24 appearing at the output of the sample/hold circuit 27 includes unnecessary higher harmonic components. However, the low frequency component only of this prewobbling tracking error signal 24 has a significance from the aspect of tracking control. Therefore, after attenuating components having frequencies higher than a predetermined frequency by the low-pass filter 28, the prewobbling tracking error signal 24 is combined with the push-pull tracking error signal 16 including an offset $\epsilon$ in an adder circuit 32 to obtain a composite tracking error signal 33. The servo system operates to attain the tracking control on the basis of this composite tracking error signal 33.

Since the offset $\epsilon$ occurs only in the push-pull tracking error detecting system, the relative value of this offset $\epsilon$ included in the composite tracking error signal 33 is reduced to $Kd/(Kd+Kw)$ when the servo system is arranged to have a structure as shown in FIG. 7. Therefore, it can be seen that the higher the gain Kw, the effect of offset suppression performance becomes greater. However, according to the theorem of sampling, the highest frequency component for which the prewobbling tracking error signal 24 has a significance is $0.5 \cdot N \cdot fd$, where N is the number of the wobbled track marks per track, and fd is the frequency of rotation of the disc. Thus, in a high frequency range, the tracking error signal in the prewobbling system must be sufficiently small as compared to that in the push-pull system. Therefore, the value that the gain Kw can take is limited by the number N of the wobbled track marks per track, the frequency of rotation fd of the disc and the time constant of the low-pass filter 28.

The inventors analyzed the above relation by simulation with a computer. The results of analysis have proved that, although stabilization of the servo system and an improvement in the effect of offset suppression can be attained when the servo system is constructed to meet conditions as described below, the operation of servo system becomes unstable when the frequency fe is selected to be higher than a value as described below. Also, the results of analysis have proved that any appreciable effect on the offset suppression cannot be expected when the frequency fe is selected to be lower than a value as described below.

Figure 8:
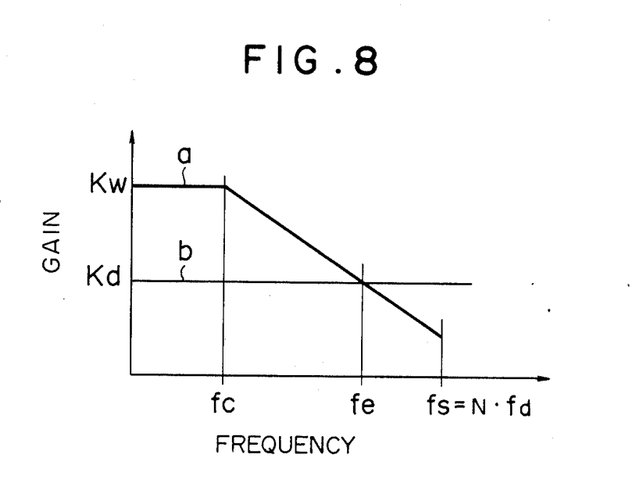
FIG. 8 is a graph illustrating the conditional relation employed in the present invention.

How to select the frequency fe will be described with reference to FIG. 8. In FIG. 8, a represents the composite characteristics of the gain Kw of the prewobbling tracking error detecting element 26 and the Gf of the low-pass filter 28, and b represents the gain Kd of the push-pull tracking error detecting element 25. In a, the composite gain is attenuated in a high frequency range due to the characteristic of the low-pass filter 28. Suppose that the gain represented by a is equal to that represented by b at the frequency fe. It is apparent that the frequency fe has an upper limit, and the servo system operates stably when the upper limit of fe is as follows:

$$fe < 1/5 \cdot N \cdot fd \tag{1}$$

Also, from the aspect of offset suppression, the frequency fe should not be too low, and its practical lower limit is as follows:

$$1/50 \cdot N \cdot fd < fe \tag{2}$$

Therefore, the servo system can operate stably with improved performance when the value of fe is selected to satisfy both the relations (1) and (2), that is, when selected to lie within the following range:

$$1/50 \cdot N \cdot fd < fe < 1/5 \cdot N \cdot fd \quad (3)$$

Now, practical numerical example will be given to explain the invention using the servo system shown in FIG. 7.

Suppose that the transfer function Gh(s) of the sample/hold circuit 27 is expressed as follows:

$$Gh(s) = \frac{1 - e^{s\tau}}{S} \cdot \frac{1}{\tau} \quad (4)$$

Suppose further that the transfer function Gf (s) of the primary low-pass filter 28 is expressed as follows:

$$Gf(s) = \frac{1}{1 + ST_1} \quad (5)$$

The transfer function $G_2(s)$ of the phase compensating element 29 is expressed as follows:

$$G_2(s) = \frac{1 + sT_2}{1 + s\alpha T_2} \quad (6)$$

The tracking actuator 30 is assumed to be that of a second order system, and its transfer function Ga(s) is expressed as follows:

$$Ga(s) = \frac{\omega_0^2}{S^2 + 2s\xi\omega_0 + \omega_0^2} \quad (7)$$

Practical numerical values are now applied to the individual constants. The sampling period $\tau$ is expressed as follows:

$$\tau = 1/fs = 1/(N \cdot fd) \quad (8)$$

where fs is the sampling frequency. It is supposed herein that the frequency of rotation fd of the disc is 30 Hz, and the number N of the wobbled track marks per track is 16. Then, the sampling frequency fs is fs=480 Hz, and the sampling period $\tau=1/480$ sec. It is supposed also that the cut-off frequency of the low-pass filter 28 is 10 Hz. Then, $T_1$ in the equation (5) is calculated as follows:

$$T_1 = \tfrac{1}{2}\pi \times 10 = 1.59 \times 10^{-2} \text{ (sec)} \quad (9)$$

It is supposed also that $\alpha=0.1$, and $T_2=1.8\times 10^{-4}$ in the transfer function $G_2(s)$ of the phase compensating element 29. It is also supposed that the damping factor $\xi=0.3$, and the natural frequency fo=45 Hz in the transfer function Ga(s) of the actuator 30. Then, $\omega_0$ in the equation (7) is calculated as follows:

$$\omega_0 = 2\pi fo = 282.7 \text{ (rad/sec)} \quad (10)$$

It is supposed also that the gain constant Kd of the error detecting element 25 in the push-pull tracking system is Kd=1000. The numerical values of all the constants, in the servo system shown in FIG. 7, except that of the gain constant Kw of the error detecting element 26 in the wobbled system, have been described above.

Then, the gain constant Kw of the error detecting element 26 in the wobbled system is determined on the basis of the relation (3). In this embodiment, the sampling frequency fs is selected to be fs=480 Hz. Therefore, the relation (3) is rewritten as follows:

$$9.6 < fe < 96 \text{ (Hz)} \quad (11)$$

Figure 9:
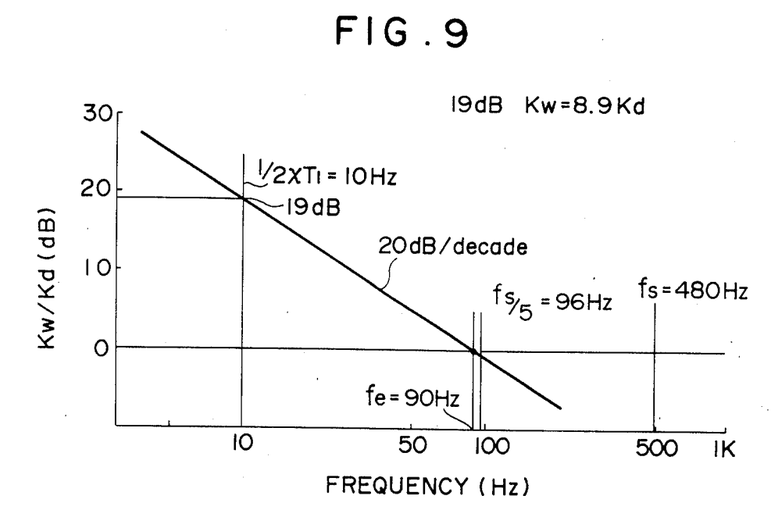
FIG. 9 is a graph illustrating application of the conditional relation of the present invention to the servo system.

When now the frequency fe is selected to be fe=90 Hz, the maximum ratio between Kw and Kd can be determined as shown in FIG. 9. When the frequency fe is set at fe=90 Hz, the gain of the low-pass filter 28 decreases at a rate of 20 dB/decade. A straight line having a gradient of 20 dB/decade and passing a point where the gain is 0 dB at fe=90 Hz is drawn. The gain at a point where this line intersects the cut-off frequency, 10 Hz, of the low-pass filter 28 indicates the value of the ratio Kw/Kd, and this value is 19 dB in this case. Therefore, the maximum value of Kw is calculated as follows:

$$Kw = 8.9 \text{ Kd} = 8900 \quad (12)$$

In this case, the dc offset can be reduced to about 1/10 in comparison with the device using only the push-pull tracking system. In the above discussion, the influence of the transfer function Gh(s) of the sample/hold circuit 27 given by the equation (4) is ignored. However, such an influence is almost negligible because a gain reduction due to the equation (4) is not so marked in a frequency range lower than 1/5 of the sampling frequency fs.

Figure 10:
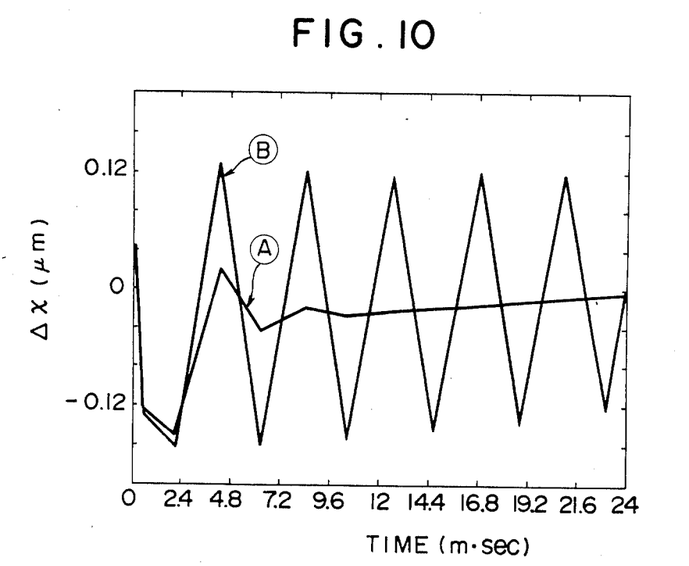
FIG. 10 is a graph illustrating the response characteristic of the servo system when the conditional relation of the present invention is satisfied and is not satisfied.

The values of Kw and Kd have been determined by the above calculation. How the servo system operates when, for example, the value of Kw is more than 8900 will be illustrated by simulation with a computer. A model of the servo system was prepared using the numerical values described above, and the response of the servo system model relative to time was calculated. FIG. 10 is a graph showing the results of the calculation, and the horizontal and vertical axes represent time and $\Delta x$ respectively. The curve (A) in FIG. 10 represents the system response when Kw=8900. It will be seen that, although the waveform of $\Delta x$ oscillates somewhat in an initial period of time of about 10 msec, the waveform converges gradually toward zero thereafter and shows a good tracking characteristic. On the other hand, the curve (B) represents the system response when Kw=15,000. It will be seen that the response has a triangular hunting waveform. The peak interval of the waveform of $\Delta x$ is equal to the sampling period $\tau$. It can be seen that, when the value of Kw is increased beyond the condition set forth by the relation (3), such a hunting waveform appears resulting in instability of the operation of the servo system.

Figure 11:
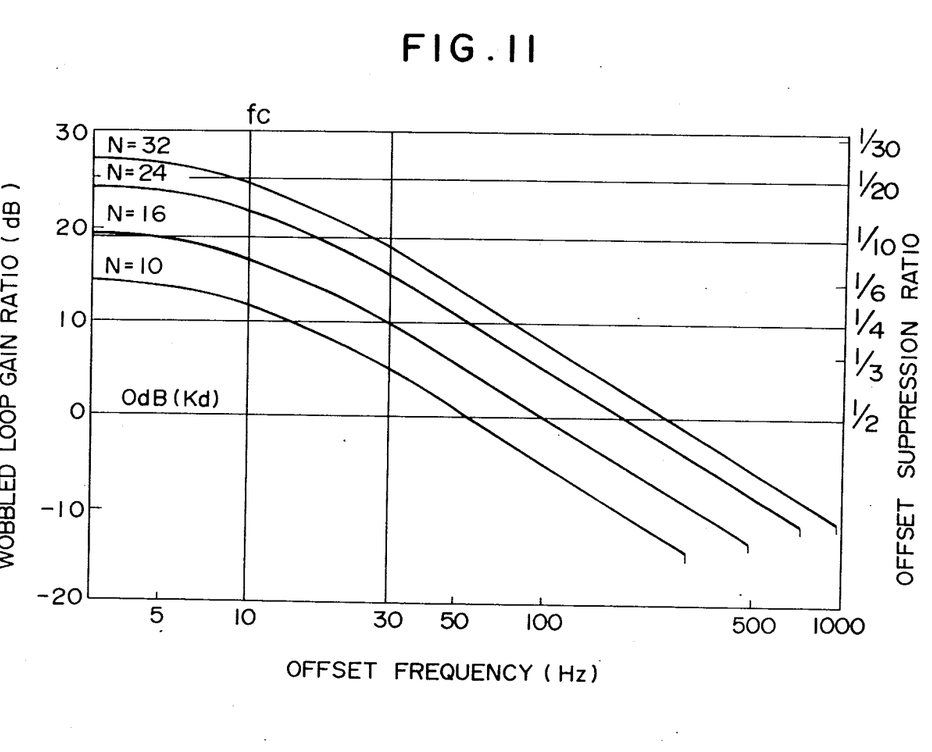
FIG. 11 is a graph showing the relation between the number N of wobbled track marks per track and the stable maximum gain curve in the servo system of the present invention.

The above discussion has referred to the case where the number N of the wobbled track marks per complete track is N=16. FIG. 11 is a graph showing the results of calculation of stable maximum gain curves by similar simulation with a computer for a plurality of cases where N=10, N=16, N=24 and N=32. It will be seen in FIG. 11 that, under the condition in which the relation (1) holds, the larger the number N, the allowable value of Kw is larger, and, hence, the effect of offset suppression can be enhanced.

Figure 12:
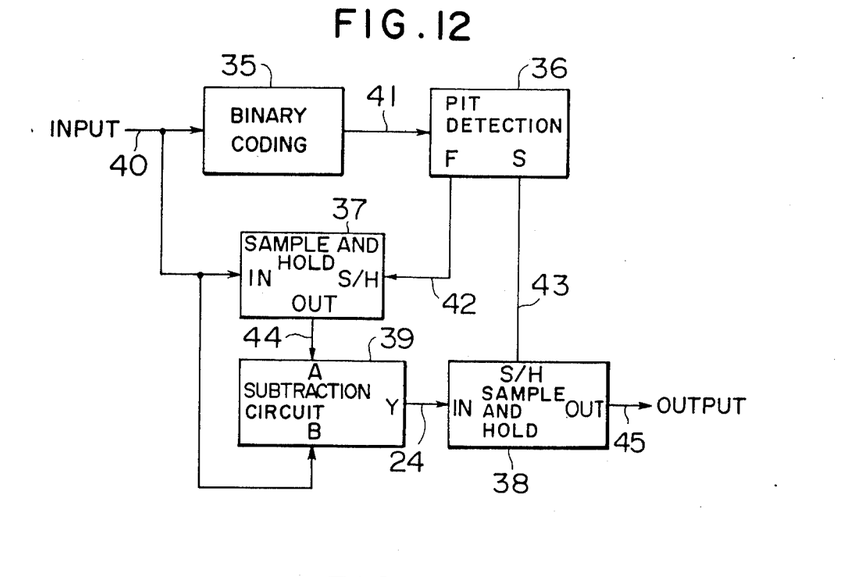
FIG. 12 is a block diagram showing the basic structure of the essential elements of the servo system shown in FIG. 7.
Figure 13:
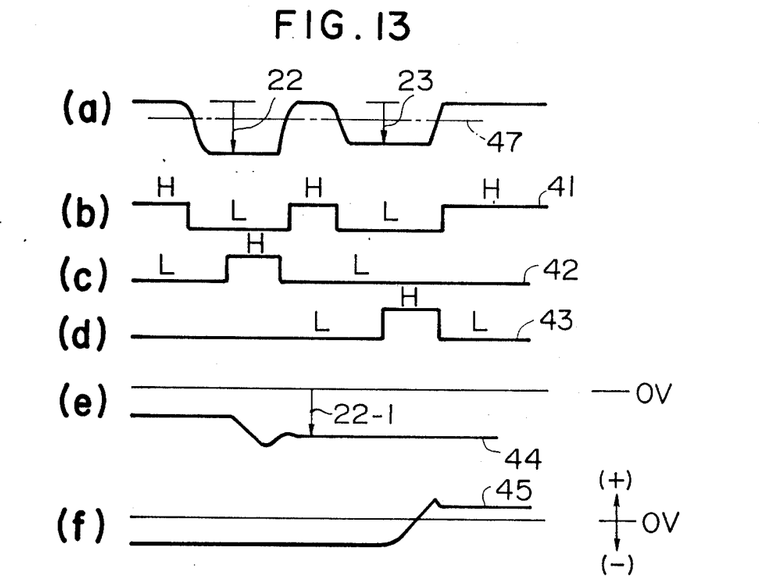

FIG. 12 is a block diagram showing the basic structure of the tracking error detecting element 26 and sample 1 hold circuit 27 shown in FIG. 7. FIG. 13 shows signal waveforms appearing at various parts of FIG. 12. Waveforms shown in (a), (b), (c), (d) and (e) of FIG. 13 correspond to signals 40, 41, 42, 43 and 44 shown in FIG. 12 respectively.

The operation of the blocks shown in FIG. 12 will be described with reference to FIG. 13. The relative luminance signal from the light detector 13 (the sum signal of the output signals of the light receiving sections 131 and 132) is applied as an input signal 40 having a waveform as shown in (a) of FIG. 13. This input signal 40 is applied to a binary coding circuit 35 where the input signal 40 is clipped at a threshold level 47 shown in (a) of FIG. 13 to be turned into a binary signal 41 having a waveform as shown in (b) of FIG. 13. The binary signal 41 is applied to a pit detecting circuit 36 where elongate pits (wobbled track marks) carrying track error information are detected. The pit detecting circuit 36 applies a first sample signal 42 having a waveform as shown in (c) of FIG. 13 to a first sample and hold circuit 37 and applies also a second sample signal 43 having a waveform as shown in (d) of FIG. 13 to second sample and hold circuit 38. The information (22 shown in (a) of FIG. 13) contained in the first elongate pit 20-1 is sampled by the sample and hold circuit 37 while the first sample signal 42 is in its high level, and is then held in the sample and hold circuit 37 as soon as the sample signal 42 is turned into its low level from the high level. Thus, an output signal 44 held at a level 22-1 and having a waveform as shown in (e) of FIG. 13 appears from the first sample and hold circuit 37. This output signal 44 from the sample and hold circuit 37 and the input signal 40 are applied to a differential circuit 39, and the output signal 24 of the subtraction circuit 39 is applied to the second sample and hold circuit 38. The signal 24 is sampled while the second sample signal 43 is in its high level and is then held as soon as the signal 43 is turned into its low level from the high level. Thus, a tracking error signal 45 having a waveform as shown in (f) of FIG. 13 appears from the second sample and hold circuit 38.

It will be understood from the foregoing detailed description that the present invention provides a tracking servo system in which a push-pull tracking error can be greatly suppressed, and which can operate stably with improved tracking performance. Therefore, tracking with high accuracy can be attained by application of the present invention to an apparatus such as an optical disk file apparatus.

What is claimed is:

1. A tracking control method for a composite wobbled tracking servo system, comprising the steps of:
   preparing a rotary recording medium having a header field and a data field alternately arranged along the direction of rotation, guide grooves (pregrooves) being provided in at least said data field, said header field including at least one pair of wobbled track marks disposed in a relation wobbled relative to the center of a track;
   irradiating the recording surface of said recording medium with a light spot;
   detecting a first tracking error signal from the reflection of said light spot diffracted by said pregroove on said recording medium;
   detecting a second tracking error signal from the reflection of said light spot passing said wobbled track marks;
   correcting said first tracking signal on the basis of said second tracking signal, the gain of said second tracking error signal being selected to be higher than that of said first tracking error signal in a low frequency range, high frequency components of said second tracking error signal being attenuated by low-pass filter means having a predetermined cut-off frequency so that the gain of said second tracking error signal having been passed through said low-pass filter means becomes equal to that of said first tracking error signal at a frequency fe satisfying the relation $$1/50 \cdot N \cdot fd < fe < 1/5 \cdot N \cdot fd$$

where fd is the frequency of rotation of said recording medium, and N is the number of said header fields included in one complete revolution of said recording medium;
   combining said second tracking error signal having been passed through said low-pass filter means with said first tracking error signal to provide a composite tracking error signal; and
   using said composite tracking error signal for the tracking control.

2. A tracking control method as claimed in claim 1, wherein said light spot is positioned on one of the center of said pregroove and the center of a land between said pregrooves, under control of said composite tracking error signal.

3. A tracking control method as claimed in claim 1, wherein the gain of said second tracking error signal is selected to be about 8.9 times as high as that of said first tracking error signal.

4. A tracking control method as claimed in claim 1, wherein said low-pass filter means is a primary low-pass filter having a cut-off frequency of about 10 Hz.

5. A tracking control method for a composite wobbled tracking servo system, comprising the steps of:
   preparing a rotary recording medium rotating at a frequency fd and having a first field and a second field alternately arranged along the direction of rotation to provide a total of N first fields in one complete revolution, guide grooves (pregrooves) being provided in at least said second field, each of said first fields including at least one pair of wobbled track marks disposed in a relation wobbled relative to the center of a track;
   irradiating the recording surface of said recording medium with a light spot;
   detecting a first tracking error signal from the reflection of said light spot diffracted by said pregroove on said recording medium;
   detecting a second tracking error signal from the reflection of said light spot passing said wobbled track marks;
   holding said second tracking error signal in holding means while said light spot passes said second field;
   attenuating the gain of said second tracking error signal held in and appearing from said holding means by low-pass filter means so that the gain of said second tracking error signal having been held in said holding means and passed through said low-pass filter means becomes equal to that of said first tracking error signal at a frequency fe satisfying the relation $$1/50 \cdot N \cdot fd < fe < 1/5 \cdot N \cdot fd ;$$

combining said second tracking error signal having been passed through said low-pass filter means with said first tracking error signal to provide a composite tracking error signal; and
   using said composite tracking error signal for the tracking control.

6. A tracking control method as claimed in claim 5, wherein said light spot is positioned on one of the center of said pregroove and the center of a land between said pregrooves, under control of said composite tracking error signal.

7. A tracking control method as claimed in claim 5, wherein said low-pass filter means is a first order low-pass filter having a cut-off frequency lower than said frequency fe.

8. A tracking control apparatus for a composite wobbled tracking system, comprising:
   a rotary recording medium having a first field and a second field alternately arranged along the direction of rotation, guide grooves (pregrooves) being provided in at least said second field, said first field including at least one pair of wobbled track marks disposed in a relation wobbled relative to the center of a track;
   irradiating means for irradiating the recording surface of said recording medium with a light spot;
   first detecting means for detecting a first tracking error signal from the reflection of said light spot diffracted by said pregroove on said recording medium
   second detecting means having a gain higher than that of said first detecting means and detecting a second tracking error signal from the reflection of said light spot passing said wobbled track marks;
   low-pass filter means for attenuating the gain of said second tracking error signal so that the gain of said second tracking error signal having been passed through said low-pass filter means becomes equal to that of said first tracking error signal at a frequency fe satisfying the relation $$1/50 \cdot N \cdot fd < fe < 1/5 \cdot N \cdot fd$$

where N is the number of said first fields included in one complete revolution of said recording medium, and fd is the frequency of rotation of said recording medium;
   signal combining means for combining the output signal of said low-pass filter means with said first tracking error signal to generate a composite tracking error signal; and
   driving means for driving tracking means provided in said irradiating means in response to the output signal of said signal combining means.

9. A tracking control apparatus as claimed in claim 8, wherein said tracking means positions said light spot on one of the center of said pregroove and the center of a land between said pregrooves in response to the output signal of said signal combining means.

10. A tracking control apparatus as claimed in claim 8, wherein said second detecting means has a gain which is about 8.9 times as high as that of said first detecting means.

11. A tracking control apparatus as claimed in claim 8, wherein said low-pass filter means is a first order low-pass filter having a cut-off frequency lower than said frequency fe.

12. A tracking control apparatus as claimed in claim 8, wherein said second detecting means detects said second tracking error signal on the basis of the relative intensity of the reflections of said light spot passing said wobbled track marks respectively and includes third means for generating control pulse signals on the basis of said reflections, and fourth means operative in response to said control pulse signals for sampling the signal indicative of the difference between the reflections of said light spot passing said wobbled track marks respectively and then holding said sampled signal.

13. A tracking control apparatus for a composite wobbled tracking servo system, comprising:
   a rotary recording medium having a first field and a second field alternately arranged along the direction of rotation, guide grooves (pregrooves) being provided in at least said second field, said first field including at least one pair of wobbled track marks disposed in a relation wobbled relative to the center of a track;
   irradiating means for irradiating the recording surface of said recording medium with a light spot;
   first detecting means for detecting a first tracking error signal from the reflection of said light spot diffracted by said pregroove on said recording medium;
   second detecting means having a gain higher than that of said first detecting means and detecting a second tracking error signal from the reflection of said light spot passing said wobbled track marks;
   low-pass filter means coupled to said second detecting means for attenuating the gain of said second tracking error signal;
   signal combining means for combining the output signal of said low-pass filter means with said first tracking error signal to generate a composite tracking error signal; and
   driving means for driving tracking means provided in said irradiating means in response to the output signal of said signal combining means;
   said low-pass filter means attenuating the gain of said second tracking error signal so that the gain of said second tracking error signal after having been passed through said low-pass filter means becomes equal to that of said first tracking error signal at a frequency fe satisfying the relation $$1/50 \cdot N \cdot fd < fe < 1/5 \cdot N \cdot fd$$

where N is the number of said first fields included in one complete revolution of said recording medium, and fd is the frequency of rotation of said recording medium.

* * * * *